(12) United States Patent
Zara et al.

(10) Patent No.: US 6,842,749 B2
(45) Date of Patent: Jan. 11, 2005

(54) METHOD TO USE THE INTERNET FOR THE ASSEMBLY OF PARTS

(75) Inventors: Anna M. Zara, Menlo Park, CA (US); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 502 days.

(21) Appl. No.: 09/853,978

(22) Filed: May 10, 2001

(65) Prior Publication Data

US 2002/0169648 A1 Nov. 14, 2002

(51) Int. Cl.[7] ............................................. G06F 17/30
(52) U.S. Cl. .................. 707/3; 707/1; 707/2; 707/4; 707/10
(58) Field of Search .................. 707/1–10; 700/116, 700/117; 29/428–430, 592; 705/8; 235/435–486

(56) References Cited

U.S. PATENT DOCUMENTS

| | | | | |
|---|---|---|---|---|
| 4,332,012 A | * | 5/1982 | Sekine et al. | 700/116 |
| 4,611,380 A | * | 9/1986 | Abe et al. | 29/430 |
| 4,870,591 A | * | 9/1989 | Cicciarelli et al. | 700/107 |
| 4,937,768 A | * | 6/1990 | Carver et al. | 703/1 |
| 5,023,800 A | * | 6/1991 | Carver et al. | 700/182 |
| 6,110,213 A | * | 8/2000 | Vinciarelli et al. | 703/1 |
| 6,230,403 B1 | * | 5/2001 | Skoolicas et al. | 29/852 |
| 6,236,901 B1 | * | 5/2001 | Goss | 700/95 |
| 6,477,437 B1 | * | 11/2002 | Hirota | 700/95 |
| 6,536,670 B1 | * | 3/2003 | Postman et al. | 235/487 |
| 6,546,364 B1 | * | 4/2003 | Smirnov et al. | 703/22 |
| 6,616,702 B1 | * | 9/2003 | Tonkin | 715/515 |
| 2002/0032597 A1 | * | 3/2003 | Chanos | |

OTHER PUBLICATIONS

Chanos, "System and Method for Providing Request Based Consumer Information", Mar. 14, 2002, USPAP 20020032597.*

* cited by examiner

Primary Examiner—Alford Kindred
Assistant Examiner—Linh Black

(57) ABSTRACT

A method that comprises: 1) sending to a manufacturer a customer request for assembly instructions for a grouping of components; and 2) presenting to assemblers a set of assembly instructions which are customized and specific to the grouping of components.

26 Claims, 7 Drawing Sheets

Receiving Workflow

Manufacturer workflow

METHOD TO USE THE INTERNET FOR THE ASSEMBLY OF PARTS

FIELD OF THE INVENTION

The invention relates generally to processes for assembling products in a data center or warehouse environment.

BACKGROUND

Companies and other large entities increasingly rely on distributed computing where many user terminals connect to one or more servers that are centrally located. These locations called "data centers" may be facilities owned by the company or may be supplied by a third-party. These data centers house not only computers, but may also have persistent connections to the Internet and thus, conveniently house networking equipment such as switches and routers. Web servers and other servers that need to be network accessible are often housed in data centers. Where a third-party owns the data center, the entity in question rents a "cage" or enclosure that has racks upon which assembled/standalone units, such as computers and routers, can be installed. The entity may also simply lease the units that are rack-mountable from the third-party. In any case, the data center is usually divided into a number of predefined areas, including a shipping/docking area, assembly area, and area where enclosures and their constituent racks are kept.

Typically, the business process of installing and operating new computer or networking systems involves a series of independent stages. First, based on determined requirements, components of the systems are ordered through a vendor or supplier. Once the components for these systems are received, inventory logs the "asset" tag for the assembled rack-mountable unit which identifies it for future reconciliation/audits. While the order for the units or components thereof themselves may identify a number of attributes that each unit/component should have (i.e. amount of memory, number of ports, model number etc.), the inventory systems often do not, and may only be concerned with the fact that the item was in fact received, and what the serial number or other distinguishing identifier is. Conventional asset IDs track accounting information such as depreciation, but not other attribute information.

Once a unit or set of components which assemble to form a unit is received it is ready to be installed in the data center. Installation and assembly of components that make up a deployable "asset" is not typically performed by those employed in the receiving/warehousing department or by those who track inventory. The current environment relies on highly skilled employees for all aspects of component assembly. Because such skilled workers are in short supply, the assembly of new components into rack-mountable units in a data center can take weeks. Further, such assembly takes a longer time because the installer must first discover the configuration and other attributes of the components as well as the plan for assembly. The assembly of such components is controlled by management systems how the components are to be connected etc (i.e. the plan).

The management system is the product/care of the administrative or Information Technology (IT) departments within a large entity such as a corporation. The management system must identify, once products are received, what they consist of, and how to configure or install them. This information must be decided by the skilled technician by looking at parts that have been received or looked up by tracking the items received in the warehouse back to the original purchase order which originated the items. As is often the case, the skilled assembler must take the received components and inspect/test them to find out its attributes and configuration because the original order data and the received physical component cannot be easily correlated.

There is thus needed a more efficient assembly process that requires less use of skilled workers and increases the reliability of the assembly job and time-to-assembly of units.

SUMMARY

What is disclosed is a method comprising 1) sending to a manufacturer a customer request for assembly instructions for a grouping of components; and 2) presenting to assemblers a set of assembly instructions which are customized and specific to the grouping of components.

DETAILED DESCRIPTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

The invention primarily consists of communicating the instructions for assembling of components automatically to the assembler(s). When an order for components (i.e. computers, routers, switches etc.) is received, the outside of the shipping boxes will have machine-readable stickers (e.g. barcodes) containing identifying information for the component(s) inside. These machine-readable stickers are scanned. The scanned information is then sent to the appropriate manufacturer(s) directly. The manufacturer then returns instructions for assembly of the component to the ordering customer. These instructions are forwarded to the appropriate party responsible for assembly and installation.

Figure 1:
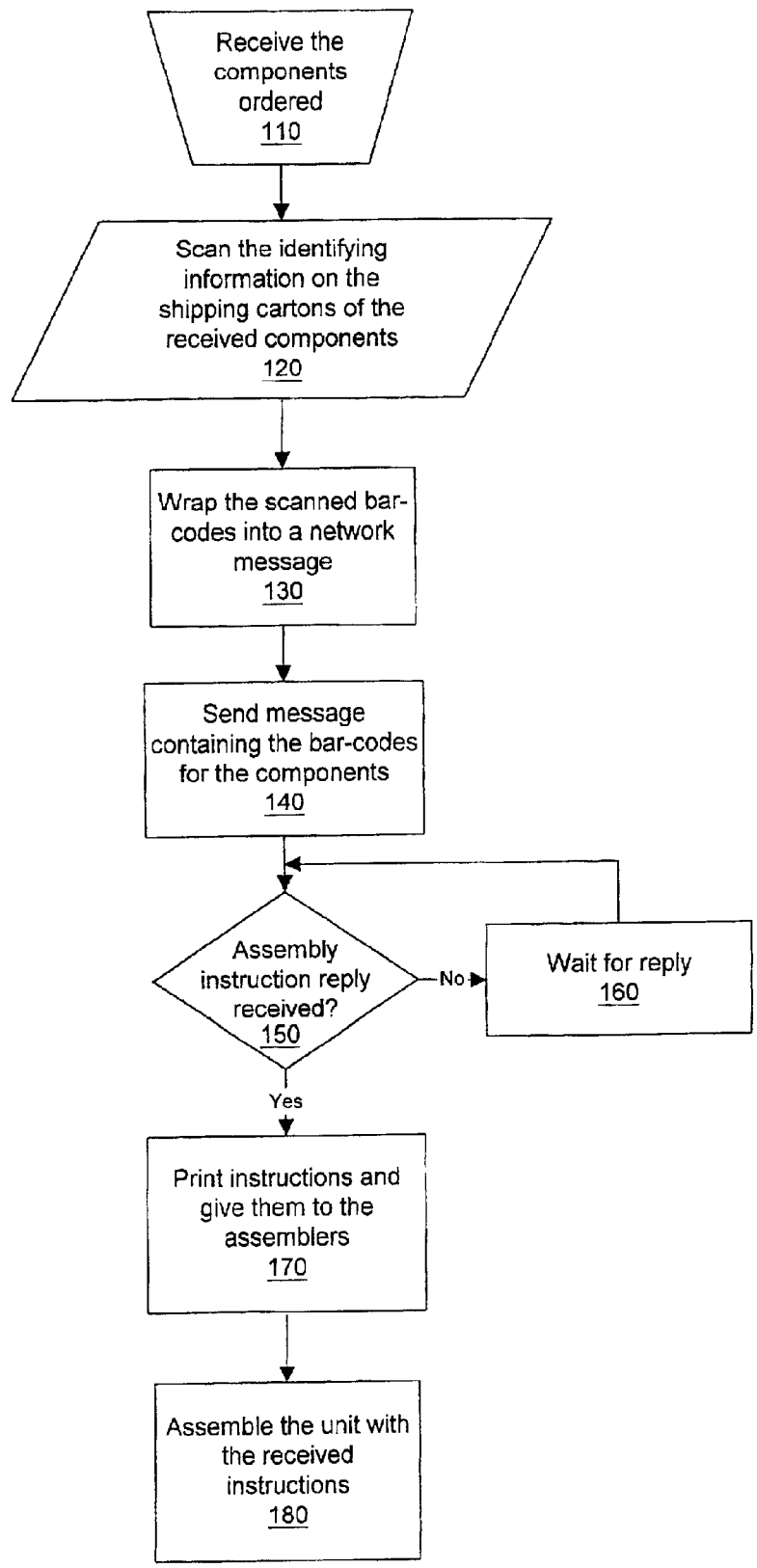
FIG. 1 is a flowchart of the primary methodology in using the Internet for the assembly of parts according to one or more embodiments of the invention.

FIG. 1 is a flowchart of the primary methodology in using the Internet for the assembly of parts according to one or more embodiments of the invention. First, the assembly of components implies that the customer has received the components ordered (block 110). For instance, if a computer system were ordered, for assembly to begin, at least some of the components that will be put into the computer system (such as memory or network interface cards) should have been received. This type of order often results in components arriving in separate cartons which then need to be assembled into the computer chassis. The computer chassis may itself be one of these components that should be received. Next, a scan of the identifying bar-codes is performed on the shipping cartons of the components to be assembled into a chassis (block 120). The identifying bar-codes or other such information is ordinarily readable using a optical scanning device such as a bar-code reader.

The scanned information (e.g. bar-codes) are then wrapped (packaged) into a message that is capable of being transported by a network (block 130). For instance, the bar-codes or other scanned information could be placed into an TCP/IP (Transmission Control Protocol/Internet Protocol) packet and sent over Ethernet. [Alternately, the scanned information could be placed into an XML (Extensible Markup Language) document and sent over the Internet using HTTP (Hypertext transport protocol)]. The message containing the bar-codes or other information is then sent to the manufacturer (block 140). The manufacturer of the base unit (e.g. computer) will be the target of the message because that company will have groupings of known supported configurations for their product. Currently, most installation documentation comes with information on how to put together all of the supported configurations.

At this point, the customer which had sent the message would be expecting a reply from the manufacturer that includes assembly instructions. Thus, the customer waits for a reply until one is received (block 160). When a reply message is received (checked at block 150), then the instructions received can be printed and given to the assemblers (block 170). Alternatively, where assemblers are equipped with PDAs (Personal Digital Assistants) or other display devices capable also of receiving data (even, for instance, computer displays), the instructions can be output on the screens of those devices. The instructions can be for instance placed in the form of a web page. The instructions given to the assemblers are "custom" in that they are specific to the particular components ordered and may include certain instructions the manufacturer would suggest which other parties may not. Once the assemblers have been given the instructions, they can then assemble the components using those instructions (block 180).

Figure 2:
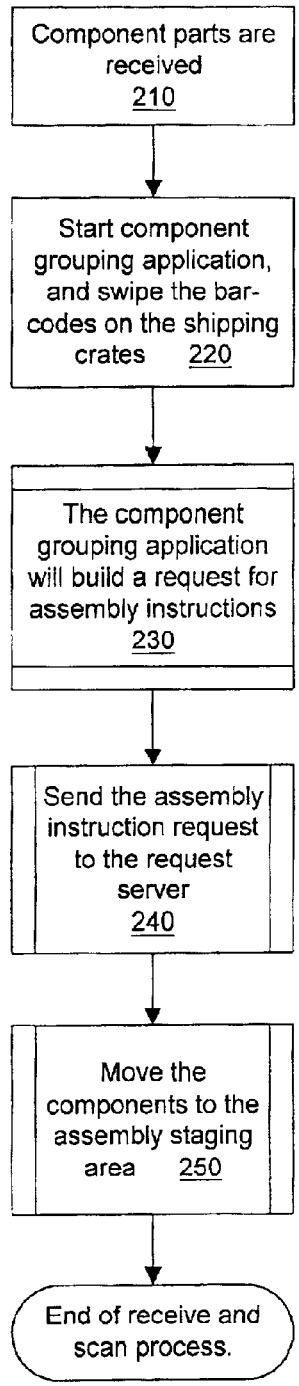
FIG. 2 is a flowchart illustrating a workflow for receiving components in a warehouse or shipping area according to one or more embodiments of the invention

FIG. 2 is a flowchart illustrating a workflow for receiving components in a warehouse or shipping area according to one or more embodiments of the invention. First, component parts are received by the customer's warehouse, shipping area or shipping dock, or even, in the case of a small company, by the mail room or at the front door (block 210). According to the invention, a component grouping application software, which could be running on a PDA, is started and the bar-codes on the shipping crates are swiped (block 220). In an alternate embodiment the scanned bar-codes may simply be sent by the PDA to a management server located remotely from the scanning device, which may instead run the component grouping application software.

The component grouping application tracks all components from a purchase order that are grouped together for assembly purposes. Once all components have been received and scanned in, the component grouping application software combines the information for all components to build a request for assembly instructions for those components. In one embodiment, the request could be an XML document request or merely, packets of data containing, among other information, the bar-code information (block 230). The assembly instruction request is then sent, according to one embodiment, to the management server (block 240) (see FIG. 3). Once the request is sent to the management server, or alternatively, during or after the raw bar-code information is sent to the management server, the components can be moved to an assembly staging area (block 250). This ends the process of receiving and scanning and can be independent of the time when the components are finally assembled.

Figure 3:
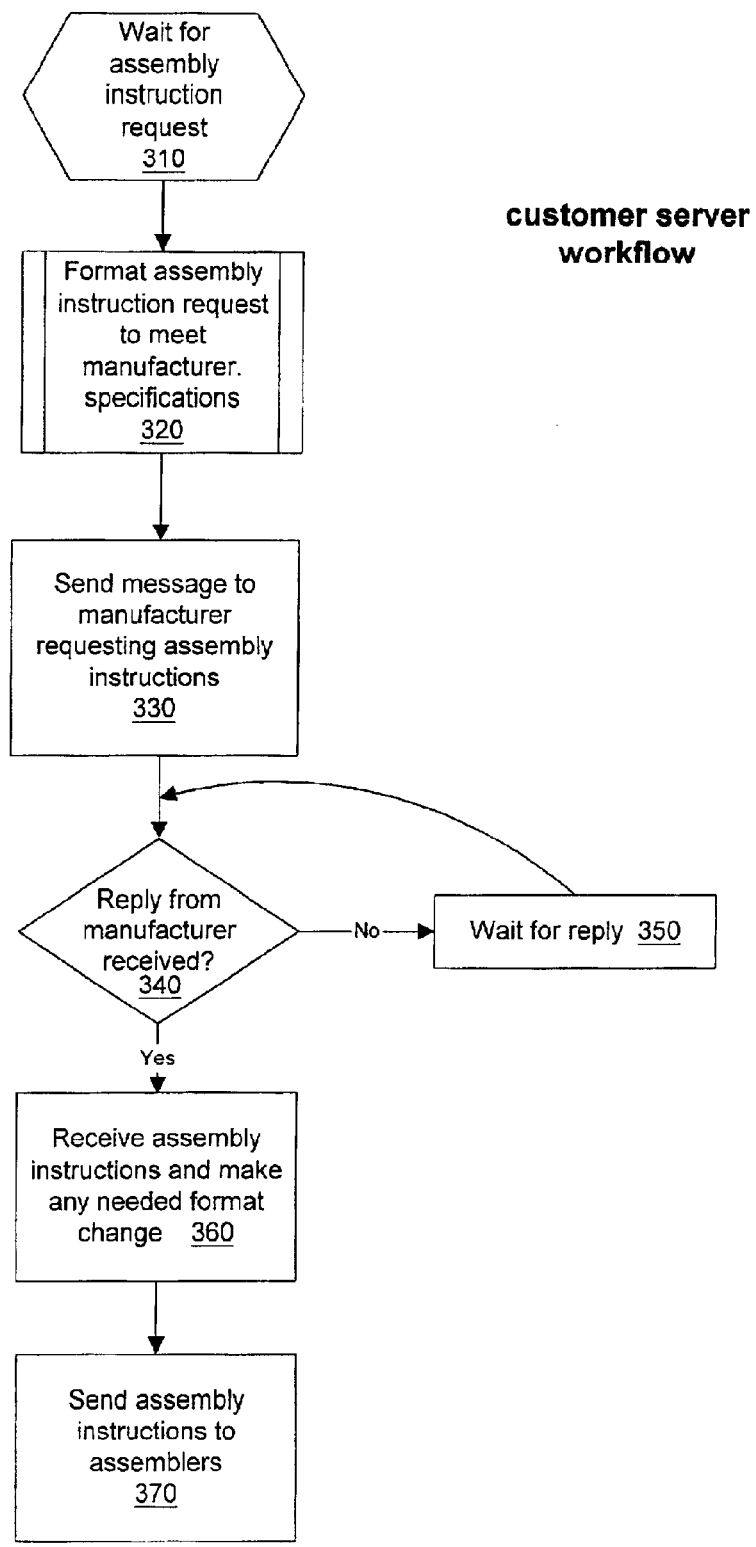
FIG. 3 is a flowchart illustrating the process of deploying an asset in accordance with one or more embodiments of the invention.

FIG. 3 is a flowchart illustrating a workflow for a management server according to one or more embodiments of the invention. The processes of the management server, according to one embodiment of the invention, do not initiate until an assembly instruction request is received. Thus, the management server must wait for an assembly instruction request (which is formulated at receiving) (block 310). The management server then formats the instruction request in accordance with required manufacturer specifications (block 320). For instance, one manufacturer may want the request to be in the form of an HTTP (HyperText Transfer Protocol) request, while another manufacturer may want the request as a database query. The management server will be able to identify who the manufacturer of the components to be assembled is based on the barcode information.

Once the instruction request for a base unit and components is properly formatted into a message understood by the manufacturer, the message can be sent to the manufacturer (block 330). The customer (acting through the management server) must then wait for a reply to the request from the manufacturer (block 350). When a reply is received from the manufacturer (checked at block 340), the instructions are received by the management server and any needed format changes are made (block 360). For instance, the assembly instructions may need to be paginated or partitioned to fit the needs of a PDA screen. Once formatted appropriately, the instructions are sent to the assemblers when assembly begins (block 370).

Figure 4:
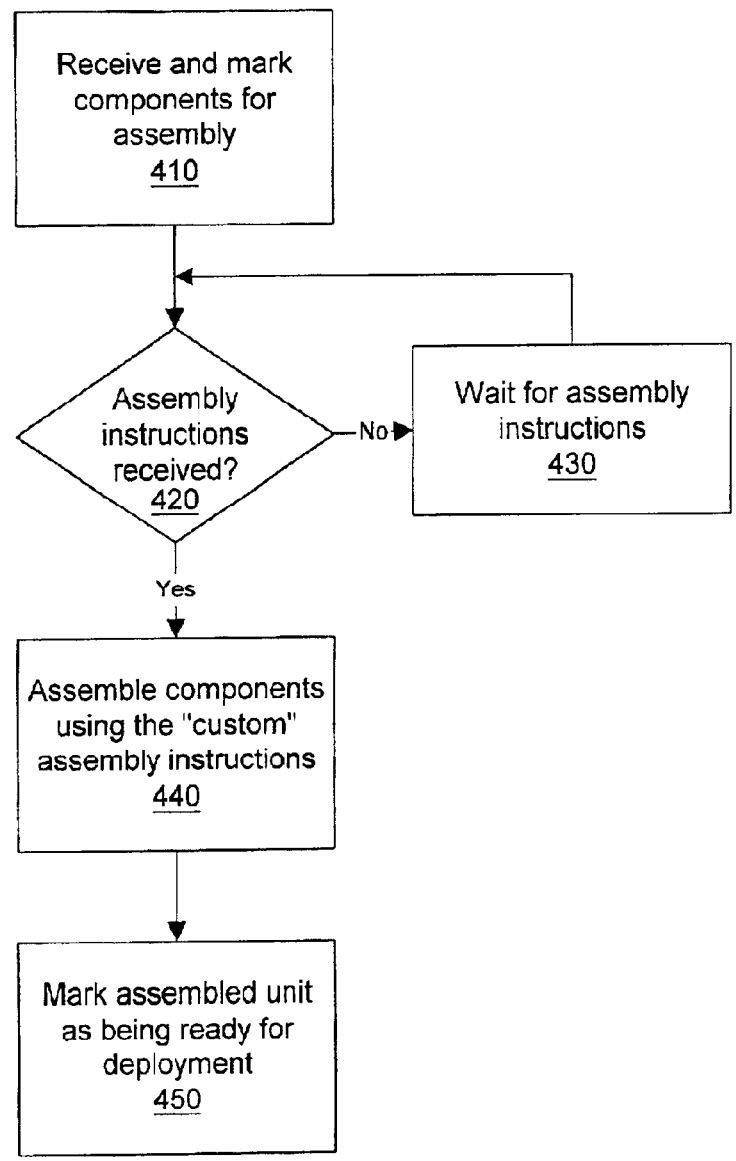
FIG. 4 is a flowchart illustrating a workflow for a components assembly according to one or more embodiments of the invention.

FIG. 4 is a flowchart illustrating a workflow for a components assembly according to one or more embodiments of the invention. The components requiring assembly are received and the marked for assembly (block 410). For instance, the base unit (such as chassis of a computer system) may be marked as undergoing assembly (to prevent attempted premature deployment). The assemblers must then wait for assembly instructions to be received (block 430). The receipt of instructions is persistently checked for (block 420). In one embodiment of the invention, the assembly instructions received are "custom" instructions received from the manufacturer to fit the particular configuration/make up of the assembled unit. Using the "custom" assembly instructions that are received, the assemblers can then assemble the components (together with or into a base unit, such as chassis, if necessary) (block 440). Once assembled, the assembled unit can be marked as ready for deployment (block 450). The status of "ready for deployment" and "being assembled" can be maintained in a database or other information store.

Such custom instructions may have certain advantageous features over stock or generic instructions that are targeted to cover every possible scenario. Such generic instructions can be cumbersome, confusing or misleading. By contrast, the custom instructions, in accordance with the invention, are received directly from the manufacturer and are tailored to fit the grouping of components that are to be assembled. Thus, superfluous information is left out. Only that information which is necessary to perform the assembly is provided to the assemblers. Further, where a certain grouping of components has an ideally different order of assemblage over another group of components, this particular order can be preserved for the assemblers.

Figure 5:
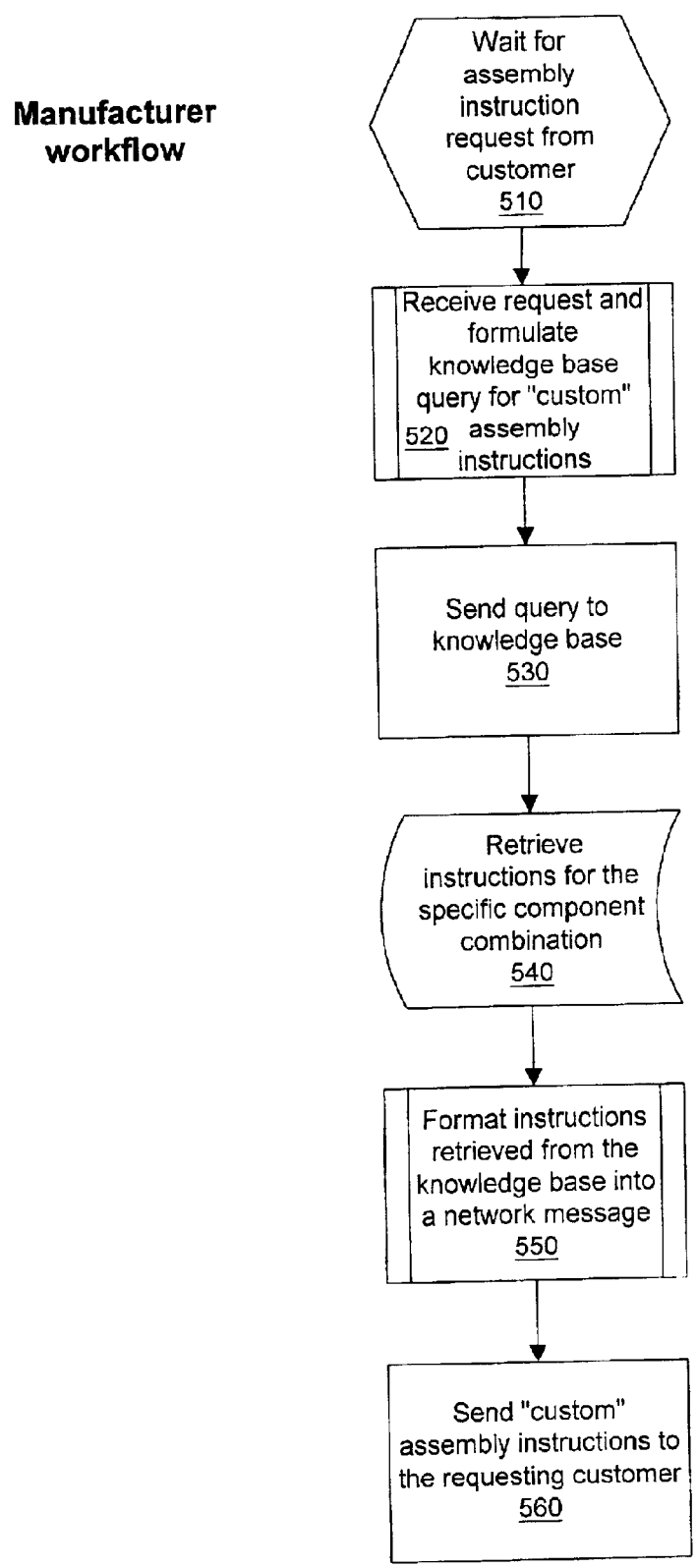
FIG. 5 is a flowchart illustrating a workflow for a manufacturer to return assembly instructions according to one or more embodiments of the invention.

FIG. 5 is a flowchart illustrating a workflow for a manufacturer to return assembly instructions according to one or more embodiments of the invention. First, the manufacturer must wait for an assembly instruction request from a customer (block 510). This request will be recognized by a server controlled by the manufacturer (hereinafter "customer service server") which will then generate a reply to the request in the following manner. Once the instruction is received, a knowledge base query is formulated to derive the custom instructions (block 520). The "knowledge base" is an artificially intelligent information store that is capable when queried of generating a dynamic set of responses. The knowledge base, which is maintained by the manufacturer is designed to anticipate possible configurations of components and has logic that can determine what a set of assembly instructions for the queried configuration should contain and what order these instructions should take. The knowledge base may also provide special precautionary statements based upon the type or manner of assembly or installation if appropriate.

Once a query for the knowledge base is formulated (based upon the received request for assembly instructions), it is then sent to the knowledge base (block 530). The knowledge base may be contained within the system comprising the customer service server or may be an external mechanism. The sending of the query to the knowledge triggers a response from the knowledge base which consists of an ordered list of instructions specific to the query. The software processing the query retrieves from the knowledge base a set of assembly instructions for the specific component combination set forth in the query (block 540). The component combination may also specify, if applicable, a base unit (such as a computer system chassis) that is to be part of the finished assembly.

Once the instructions are retrieved from the knowledge base, they are formatted into a network message (block 540). The network message formatting may involve data compression and creation of a file/record that can be wrapped into a message or set of messages that can be carried over a network. For instance, the set of instructions could be placed in a data file and then the file sent using TCP/IP. Alternatively, the instructions could be conveyed as an HTML or XML (eXtensible Markup Language) document (both of which can be carried using HTTP over TCP/IP), one which can be accessed through a browser activated by the requesting customer.

Once formatted for network transport, the assembly instructions are sent to the requesting customer (block 560). The assembly instructions will be more precise than generically available instructions since they are based on the particular component combination stated in the request. The instructions can be distributed from a server of the requesting customer to the those actually performing the assembly (the assemblers).

Figure 6:
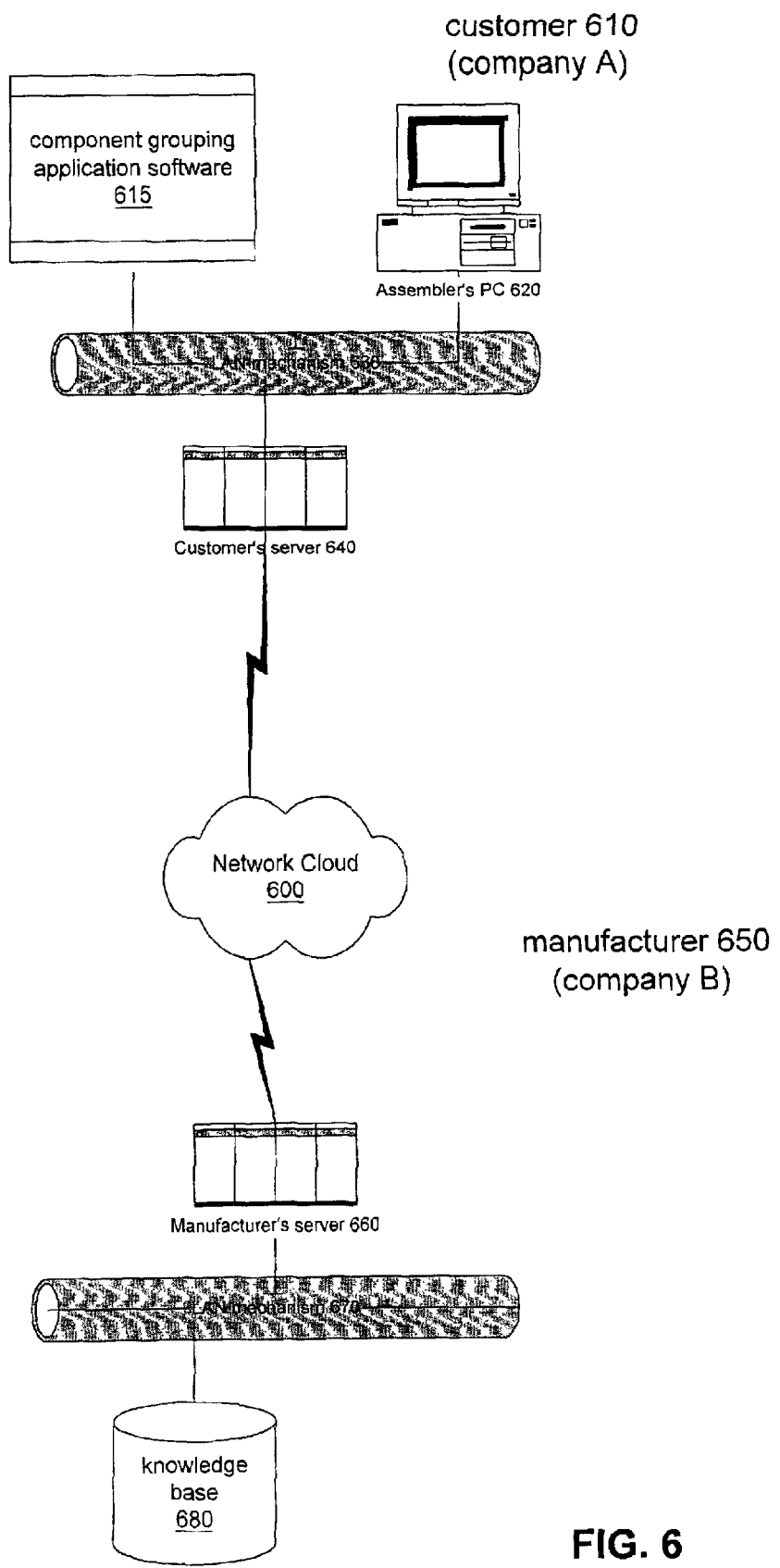
FIG. 6 illustrates the interaction among a manufacturer and a customer according to at least one embodiment of the invention.

FIG. 6 illustrates the interaction among a manufacturer and a customer according to at least one embodiment of the invention. The invention utilizes a network cloud 600 which is representative any of a combination of private networks (such as X.25, frame relay etc.) and/or public networks such as the Internet. The network cloud 600 allows the transacting of information between a customer 610, who has purchased components, and a manufacturer 650 of those components. The customer 610 may have obtained the components through a reseller, distributor or other entity, but because of the availability of a network such as network cloud 600, can communicate readily with the manufacturer 650 of those components. The invention assumes that the customer 610 is part of a first entity company A, and that the manufacturer 650 is part of a second, independent entity company B. Alternatively, the customer 610 and manufacturer 650 could be part of the same entity or organization which due to its disparity of locations uses network cloud 600 when communicating.

At the customer 610, an internal LAN (Local Network Mechanism) 630 is connected to the Internet cloud 600. LAN mechanism 630 may consist of mechanisms such as Ethernet for carrying LAN information traffic and may include protocols for interaction between users of the LAN, such as TCP/IP or IPX. The LAN mechanism 630 ties together various devices, nodes and locations of the customer 610 and ties all of these also with nodes accessible via network cloud 600. According to the invention, a component grouping application software 615, which may be PDA based, is used to send a grouping of bar-codes scanned from the shipping cartons of the received components that need assembly instructions. The component grouping application software 615 generates a network message that groups all the component bar-code information together, such as by storing it in a data file. To make the creation of the network message easier, there may be a specific scan order for the shipping cartons being grouped or the component grouping application may create an ordered list from components which were scanned in arbitrary order. The network message is generated such that it can be understood by and transported across the LAN mechanism 630.

The network message containing the grouping of bar-codes is sent over LAN mechanism 630 to a customer's server 640. Server 640 has an application software that will receive the sequenced bar-codes and create a message for the manufacturer 650's query system. Server 640 formats the message in a manner/sequence specified by or appropriate for the manufacturer 650. The message is a query for assembly instructions and contains all of the bar-codes for the components to be assembled. This message may be a query string, an XML document request or a simple raw data message (such as a data file). When the message is ready, server 640 utilizes its connection to the network cloud 600 to send the message to the manufacturer's server 660.

At the manufacturer 650, an internal LAN (Local Network Mechanism) 670 is connected to the Internet cloud 600. Manufacturer's server 660 (which resides at manufacturer 650) has an application that will receive the assembly instructions request message from customer's server 640 and build a set of custom assembly instructions. LAN mechanism 670 may consist of mechanisms such as Ethernet for carrying LAN information traffic and may include protocols for interaction between users of the LAN, such as TCP/IP or IPX. The LAN mechanism 670 ties together various devices, nodes and locations of the manufacturer 650 and ties all of these also with nodes accessible via network cloud 600. For instance, manufacturer's server 660 is connected by the manufacturer's LAN mechanism 670 to a knowledge base 680.

The knowledge base 680 is a database, neural network or other information store that contains assembly instructions for all of the components that may accompany an assembly instruction request. Also, knowledge base 680, operating in conjunction with one or more applications on server 660, logic to determine which instructions should be placed in what order. The manufacturer 650 maintains the knowledge base 680 to service customers such as customer 610 that may request assembly instructions. The manufacturer's server 660 uses a received assembly instruction request, which contains component bar-codes, to formulate a query to the knowledge base 680. This query is sent over LAN mechanism 670, and results in the knowledge base 680 returning to server 660 the set of custom assembly instructions which is specific to the component combination at the customer 610. Server 660 formats these custom assembly instructions and sends them back to customer's server 640 over network cloud 600.

Customer's server 640 receives the custom assembly instructions and places them in a format convenient for the assembler. Where there is an assembler's PC (Personal Computer) 620 with a full size screen and larger storage capability, these instructions could be accessed via a HTTP interface or by downloading an entire data file containing the entire set of custom instructions, or by printing it out to a local printer. Where the assembler has only a PDA, the instructions may be streamed or paged down in order, and can be fed as needed, preserving the sequencing suggested by the manufacturer. The instructions may be presented to the assembler in any combination of audio, video, graphical or textual formats as appropriate. The manufacturer 650 could send assembly diagrams or an audio tour or any type of data that may aid the assembler in his assembly task. Using these custom instructions, the assembler will be able to assemble the components together more accurately and efficiently. This affords the customer 610 a possible decrease in deployment time and increased reliability of the assembled components.

Figure 7:
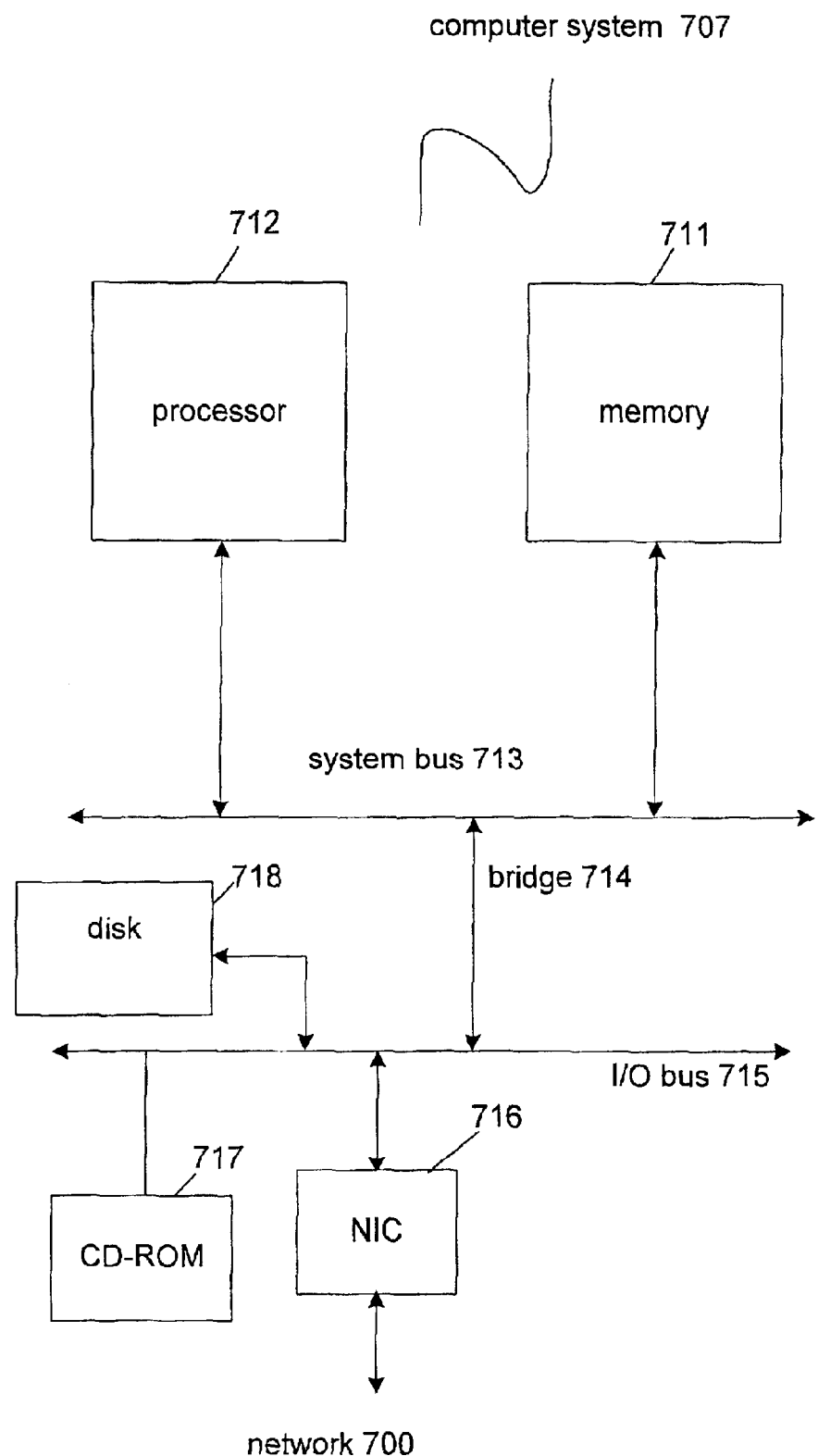
FIG. 7 is a diagram of a computer implementation of one or more embodiments of the invention.

FIG. 7 is a diagram of a computer implementation of one or more embodiments of the invention. Illustrated is a computer system 707, which may be any general or special purpose computing or data processing machine such as a PC (personal computer), coupled to a network 700. One of ordinary skill in the art may program computer system 707 to act as a management database server that is capable of acting as a customer server or a manufacturer server. The manufacturer server and customer server, are, in accordance with some embodiments of the invention, two separate and independently operating systems. According to one or more embodiments of the invention, the system 707 or systems similar to it, would be programmed to perform the following functions when deployed as a customer server:

Receiving component bar-code groupings and formatting these into a request for assembly instructions;

Sending the request over network 700 or a network connected to network 700 to a manufacturer;

Receiving from the manufacturer a reply containing custom assembly instructions;

Formatting and presenting/sending the custom assembly instructions to assemblers.

According to one or more embodiments of the invention, the system 707 or systems similar to it, would be programmed to perform the following functions when deployed as a manufacturer server:

Receiving a request for assembly instructions;

Formulating a knowledge base query based upon the request;

Sending the query to the knowledge base and retrieving custom assembly instructions;

Formatting and sending the custom assembly instructions to the customer.

In either role, system 707 has a processor 712 and a memory 711, such as RAM, which is used to store/load instructions, addresses and result data as desired. The implementation of the above functionality in software may derive from an executable or set of executables compiled from source code written in a language such as C++. The instructions of those executable(s), may be stored to a disk 718, such as a hard drive, or memory 711. After accessing them from storage, the software executables may then be loaded into memory 711 and its instructions executed by processor 712. The result of such methods may include calls and directives in the case that the asset records (and related information) are stored on disk 718, or a simple transfer of native instructions to the user database via network 700 if it is stored remotely. The knowledge base may be stored on disk 718, as mentioned, or stored remotely and accessed over network 700 by system 707.

Computer system 707 has a system bus 713 which facilitates information transfer to/from the processor 712 and memory 711 and a bridge 714 which couples to an I/O bus 715. I/O bus 715 connects various I/O devices such as a network interface card (NIC) 716, disk 718 and to the system memory 711 and processor 712. The NIC 716 allows software, such as server software, executing within computer system 707 to transact data, such as assembly instructions or requests for assembly instructions, to other nodes or servers connected to network 700. Network 700 is also connected to the data center or passes through the data center, so that sections thereof, such as assembly, or receiving, can communicate with system 707.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

We claim:

1. A computer implemented method comprising:

sending to a manufacturer a customer request for assembly instructions for a grouping of components, where sending to the manufacturer includes scanning bar-code information from the grouping of components, grouping the bar-code information, and generating the customer request for assembly instructions based on the grouped bar-code information and on specifications defined by the manufacturer;

initiating a component grouping application software at the location where the components are received, the software performing the grouping;

sending the grouped bar-code information to a customer server, the customer server also generating the request; and presenting to assemblers a set of assembly instructions that is customized and specific to the grouping of components.

2. A method according to claim 1 wherein presenting includes:

receiving said set of assembly instructions from said manufacturer.

3. A method according to claim 2 wherein presenting further includes:

formatting said received set of assembly instructions such that they are in a format utilizable by said assemblers.

4. A method according to claim 3 wherein presenting further includes:
    printing out said formatted set of assembly instructions for said assemblers.

5. A method according to claim 1 further comprising:
    waiting to receive said set of assembly instructions from said manufacturer prior to assembling of said group of components.

6. A method according to claim 1 further comprising:
    assembling said group of components using said set of assembly instructions.

7. A method according to claim 1 further comprising:
    replying to said customer request by sending said customized set of assembly instructions to said customer.

8. A method according to claim 7 wherein replying includes:
    receiving said request for assembly instructions from said customer;
    formulating a query for a knowledge base, said query based upon the content of said request; and
    retrieving from said knowledge base said customized set of assembly instructions, said set formed in response to said query.

9. A method according to claim 8 wherein said replying further includes:
    formatting said retrieved customized set of instructions into a network-ready message.

10. A method according to claim 1 wherein said manufacturer and said customer communicate over a communications network.

11. A system comprising:
    an information device utilized by an assembler of a group of components, said device configured to group bar-code information scanned from said components;
    a customer server coupled to said information device over a network, said server configured to send a request for assembly instructions, said request based on said grouped bar-code information; and
    a manufacturer server able to communicate with said customer server, said manufacturer server replying to said request with a set of customized assembly instructions, said instructions specific to said group of components represented in said request.

12. A system according to claim 11 wherein said customer server receives said reply from said manufacturer server, said customer server further configured to present to said assembler said set of customized assembly instructions in a utilizable format.

13. A system according to claim 11 further comprising:
    a knowledge base coupled to said manufacturer server, said knowledge configured to provide said set of customized assembly instructions in response to receiving a query from said manufacturer server.

14. A system according to claim 13 wherein said query is formulated by said manufacturer server based upon said request from said customer server.

15. A system according to claim 11 wherein said information device is a personal computer.

16. A system according to claim 11 wherein said information device is a personal digital assistant.

17. A system according to claim 11 wherein said manufacturer server and said customer server are connected via a network.

18. An article comprising a computer readable medium having instructions stored thereon which when executed cause:
    sending to a manufacturer a customer request for assembly instructions for a grouping of components, where sending to the manufacturer includes scanning bar-code information from the grouping of components, grouping the bar-code information, and generating the customer request for assembly instructions based on the grouped bar-code information and on specifications defined by the manufacturer;
    initiating a component grouping application software at the location where the components are received, the software performing the grouping;
    sending the grouped bar-code information to a customer server, the customer server also generating the request; and
    presenting to assemblers a set of assembly instructions that is customized and specific to the grouping of components.

19. An article according to claim 18 wherein presenting includes:
    receiving said set of assembly instructions from said manufacturer.

20. An article according to claim 19 wherein presenting further includes:
    formatting said received set of assembly instructions such that they are in a format utilizable by said assemblers.

21. An article according to claim 20 wherein presenting further includes:
    printing out said formatted set of assembly instructions for said assemblers.

22. An article according to claim 18 further causing:
    waiting to receive said set of assembly instructions from said manufacturer prior to assembling of said group of components.

23. An article according to claim 18 further causing:
    assembling said group of components using said set of assembly instructions.

24. An article according to claim 18 further causing:
    replying to said customer request by sending said customized set of assembly instructions to said customer.

25. An article according to claim 24 wherein replying includes:
    receiving said request for assembly instructions from said customer;
    formulating a query for a knowledge base, said query based upon the content of said request; and
    retrieving from said knowledge base said customized set of assembly instructions, said set formed in response to said query.

26. An article according to claim 25 wherein said replying further includes: formatting said retrieved customized set of instructions into a network-ready message.

* * * * *